(12) United States Patent
Berg

(10) Patent No.: US 8,007,170 B2
(45) Date of Patent: Aug. 30, 2011

(54) ELECTRONIC SENSOR AND METHOD FOR THE MANUFACTURE OF A SENSOR

(75) Inventor: Eckhard Berg, Gruenstadt (DE)

(73) Assignee: PEPPERL + FUCHS, Mannheim (DE)

( * ) Notice: Subject to any disclaimer, the term of this patent is extended or adjusted under 35 U.S.C. 154(b) by 395 days.

(21) Appl. No.: 12/203,219

(22) Filed: Sep. 3, 2008

(65) Prior Publication Data

US 2009/0058585 A1 Mar. 5, 2009

(30) Foreign Application Priority Data

Sep. 4, 2007 (EP) .................................. 07017332
Sep. 1, 2008 (EP) .................................. 08015398

(51) Int. Cl.
*G01K 1/00* (2006.01)
*G01K 7/00* (2006.01)
(52) U.S. Cl. ....................................... 374/208; 374/184
(58) Field of Classification Search .................. 374/208, 374/184
See application file for complete search history.

(56) References Cited

U.S. PATENT DOCUMENTS

| 5,181,779 | A * | 1/1993 | Shia et al. ........... | 374/139 |
|---|---|---|---|---|
| 2001/0023153 | A1* | 9/2001 | Mayer et al. ........... | 439/736 |
| 2004/0242545 | A1* | 12/2004 | Otsuka et al. ........... | 514/102 |

FOREIGN PATENT DOCUMENTS

| DE | 100 13 218 A1 | 9/2001 |
|---|---|---|
| DE | 102 37 904 A1 | 1/2004 |

OTHER PUBLICATIONS

European Search Report, EP Application No. EP 07 01 7332, Completion Date, Feb. 21, 2008, pp. 1-2.

\* cited by examiner

*Primary Examiner* — Lisa Caputo
*Assistant Examiner* — Mirellys Jagan
(74) *Attorney, Agent, or Firm* — John A. Merecki; Hoffman Warnick LLC

(57) ABSTRACT

The present invention relates to an electronic sensor, particularly an inductive sensor, comprising a casing sleeve, a sensor element for measuring a physical measurand, the sensor element being placed at a measurement end of the casing sleeve, an electronic module located in the casing sleeve and a connector, which is placed on a connection end of the casing sleeve opposite to the measurement end. According to the invention, the sensor is characterized in that the casing sleeve is provided with a plastic internal lining, which is closed at the measurement end of the casing sleeve and that the internal lining extends to the casing sleeve connection end to such an extent that the connector is in a sealing engagement with the internal lining. The invention also relates to a method for the manufacture of a sensor.

24 Claims, 3 Drawing Sheets

ELECTRONIC SENSOR AND METHOD FOR THE MANUFACTURE OF A SENSOR

Technical Field

Figure 1:
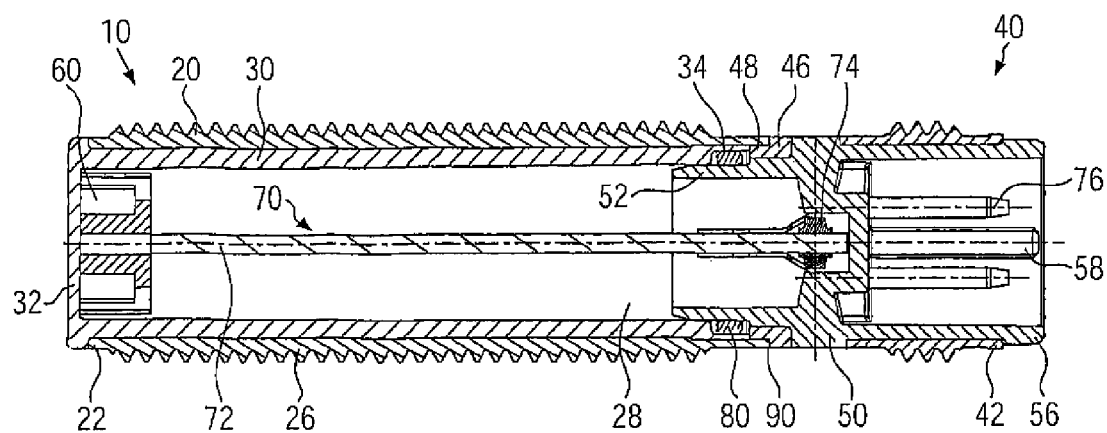

In a first aspect the present invention relates to an electronic sensor.

In a further aspect the invention relates to a method for the manufacture of a sensor.

Related Art

Such an electronic sensor is e.g. known from DE 102 37 904 B4 and has the following components: a casing sleeve, a sensor element for measuring a physical measurand, which is placed on a measurement end of the casing sleeve, an electronic module placed in the casing sleeve and a connector, which is placed on a connection end of the casing sleeve opposite to the measurement end.

Such sensors are used in numerous industrial sectors.

Electronically operating sensors are generally so constructed that at least one electronic or electromechanical module is installed in a casing, which in turn comprises several parts in order to permit an inexpensive assembly of the functional components from several directions. This suffers from the disadvantage that during manufacture the casing parts are interconnected and all the casing openings must be closed or sealed following assembly. This is particularly disadvantageous if the sensors are to be used in moist or damp applications, where particularly high demands are made on the sealing of the casing joints.

DE 100 13 218 A1 suggests to at least partly fill the casing sleeve of such a sensor, into which the sensor element, the electronic module and the connector are inserted, with a moulding material, in order to protect the electronics from humidity effects.

SUMMARY OF THE INVENTION

The object of the invention is to provide an electronic sensor of the aforementioned type, which is easy to manufacture and which has improved sealing characteristics. A method for the manufacture of a sensor with said characteristics should also be given.

Preferred embodiments of the inventive electronic sensor and advantageous variants of the inventive method form the subject matter of the dependent claims.

According to the invention an electronic sensor of the aforementioned type is further developed in that the casing sleeve is provided with an plastic internal lining, which is closed at the measurement end of the casing sleeve, and in that the internal lining extends through to the connection end of the casing sleeve to such an extent that the connector is in sealing engagement with the internal lining.

In the case of the inventive method for the manufacture of a sensor a casing sleeve is provided with an internal lining, where the internal lining is closed at a measurement end of the casing sleeve and extends up to the casing sleeve connection end opposite to the measurement end. Moreover a sensor element for measuring a physical measurand and an electronic module are inserted in the casing sleeve, a connector is attached to the casing sleeve connection end and a connection is made between the connector and the casing sleeve connection end in such a way that the connector comes into sealing engagement with the internal lining.

The essence of the invention is to so construct an electronic sensor that the number of transitions to be sealed is reduced compared with the prior art. In particular and according to the invention an electronic sensor is proposed, where there is essentially only one transition to be sealed.

In this connection another central idea of the invention also specifically relates to keeping as low as possible the number of components to be connected, so that the manufacturing costs are also reduced in this respect.

An essential advantage of the invention is that as a result of the reduced number of transitions to be sealed compared with the prior art much better sealing characteristics are obtained. Thus, the inventive sensor is particularly advantageous for applications in the hygiene sector, e.g. in the food processing industry.

A considerable improvement compared with the prior art results from the feature that the internal lining of the casing sleeve is closed at the measurement end, so that from said measurement end no vapours or other contaminants can penetrate the sensor interior.

Thus, the sensor casing essentially comprises two parts, which must be joined on assembly, namely the casing sleeve with the internal lining and the connector, which is to be connected to the casing sleeve. The casing sleeve with the internal lining can also be looked upon as a base casing and the connector can be looked upon as a lid or cover.

The invention can fundamentally be used for all sensor types, e.g. inductive, capacitive, optical, ultrasonic or temperature sensors. However, with particular advantage the invention can be used for sensors, where the internal lining closed at the measurement end leads to no further constructional tasks, which is particularly the case with inductive sensors.

In principle, the base casing and the cover associated therewith can have random shapes. It is particularly preferable for the casing sleeve to have an essentially cylindrical shape. It can once again be a cylinder with a random base surface. However, appropriately the casing sleeve has a cylindrical circular shape and in particular on the outside of the casing sleeve is provided a thread for fastening and optionally adjusting the sensor in a holder. Thus, substantially the casing has a cylindrical or tubular shape.

In principle, the casing sleeve can be made from a random material, e.g. plastic. However, in preferred variants the base casing, i.e. the casing sleeve, and at least parts of the cover are made from metal, said components being completely or only partly lined on their insides with plastic.

To reduce to the maximum a passage of gases, particularly water vapour, through the internal lining, the internal lining is preferably formed from a material with a low vapour diffusion rate. In a particularly advantageous manner materials can be used for the internal lining, the vapour diffusion rate of which is around a factor of 10 to 100, i.e. one to two orders of magnitude, below the values for materials that are usually employed, like polyamides.

E.g. LCP-materials (Liquid Crystal Polymers) can be used for the internal lining which materials are characterized by particularly low water vapour transmission rates and low oxygen permeabilities.

It is in particular useful to employ materials where the water vapour transmission rate is smaller than $0.1\ g \times mm/m^2 \times day$, preferably smaller than $0.01\ g \times mm/m^2 \times day$, and/or where the oxygen permeability is smaller than $0.1\ cm^3 \times mm/m^2 \times day \times atm$, preferably smaller than $0.01\ cm^3 \times mm/m^2 \times day \times atm$.

In a particularly advantageous manner the sensor according to the invention can be used for hygienically demanding applications, e.g. in food technology.

In another advantageous development the connector has a connection sleeve to be connected to the casing sleeve and a connection body made from plastic. The connection sleeve is appropriately made from metal. The connection body can also be referred to as the internal lining of the connection sleeve. In this development of the invention during assembly of the sensor there are essentially only two metal parts, namely the casing sleeve and the connection sleeve which have to be interconnected, so that looked upon in simplified form the sensor casing essentially comprises two parts, namely the base casing and the cover.

In principle and in supplementary or alternative manner, there can be a connection between the connection body and casing sleeve and/or internal lining. According to the invention it is important that the connector in some way provides a seal with the cup-shaped internal lining of the casing sleeve.

Basically, the connector can be in the form of or can have an outgoing cable or can have a plug and socket connection. In the outgoing cable variant a seal must be provided between cable and connection body.

A possibility to seal the cable outlet is to provide sealing devices for sealed guiding of the cable to the outside at the connection body. These can be formed directly as one piece as parts of the connection body.

To achieve a secure fastening of the cable inside of the sensor, it is preferably provided, that there are strain-relieved elements in the connection body. These can e.g. be designed in the shape of a two-piece sleeve, which is laid around the cable and is inserted into the connection body. In this context it is preferred, if both the sealing devices and the strain-relieved elements are designed in such a way that the sealing action and the strain relief amplify through tensile forces on the cable.

The functionality of the sensor casing is increased if the connection sleeve has recesses for forming windows for optical informations from the sensor interior. This can e.g. involve status or measurement informations, e.g. "object identified" or "self test running", which can in particular be emitted via light emitting diodes, which can form part of the electronic module.

In principle, the internal lining can be a separate component, which is engaged in the casing sleeve. However, it is in particular preferred that the internal lining is introduced into the casing sleeve by injection moulding. This in itself leads to a particularly intimate connection between casing sleeve and internal lining.

In preferred variants the connection body is also moulded into the connection sleeve. This method can take place in corresponding manner to the fitting of the internal lining in the casing sleeve.

When designing the connection body, it is preferably provided that the connection body enters into an essentially gapless connection to the recesses in the connector, so that no dirt edges or sources of infection can emerge. This can be achieved in an especially easy way when putting the connector into place by injection moulding methods.

In order to allow a passing out of optical informations, the connection body is appropriately made from a light conducting plastic. The casing sleeve internal lining can also be formed from transparent or light conducting material. Then optical informations can also be passed via the internal lining, e.g. at the measurement end and/or connection end.

In principle, the casing sleeve can be connected to the connection sleeve in random manner, e.g. by welding. In simple variants only a few welding spots need be made. However, the sealing action can be further improved if a circumferential welding seam is formed between casing sleeve and connection sleeve, which can e.g. be generated by laser welding.

A further mechanical improvement can be brought about if casing sleeve and connection sleeve overlap one another. On the one hand this facilitates welding and on the other the edges of the casing and connection sleeves can be so shaped that the connection sleeve can be locked with the casing sleeve on assembling the sensor. Such a locking action can in particular be appropriate for an initial fixing, because once again this facilitates the making of a welding seam.

The functionality of the internal lining is increased if the internal lining forms a receptacle for the sensor element in the region of the measurement end. Appropriately for this purpose an internal diameter of the internal lining is so chosen that an e.g. cylindrical sensor element can be easily pushed into the internal lining and can be guided and held by the same. A separate cup is then no longer necessary.

The passing out of optical informations can take place more effectively if a printed circuit board of the electronic module in an area where LEDs are located projects into the transparent connection body.

When optionally providing elements for the strain relief it is appropriate to design them transparent as well to make it possible for the light signals emitted by the LED to be passed on well.

In order to improve sealing between the two parts, i.e. between the casing sleeve with the internal lining and the connector, appropriately there is a sealing ring between internal lining and connector. To this end the connection body preferably has a socket projecting into the interior of the internal lining and whose outside forms a contact surface for the sealing ring. This facilitates a clearly defined seating of the seal.

A further improvement to the sealing characteristics in this connection can be brought about in that an inner area of the internal lining of the casing sleeve overlaps with the socket in a sealing area and that the internal lining in the sealing area has a reduced thickness for forming a reception area for a sealing ring. This leads to excellent sealing characteristics.

An alternative or additional possibility to form an improvement of the sealing properties is given, if the connection body forms a sealing lip, and an engagement region cooperating with the sealing lip is provided at the internal lining of the casing sleeve. Here it is possible to form the sealing lip such that, if the connection sleeve is inserted into the casing sleeve, the sealing lip is pushed slightly back into the interior and can slide back to its original position in the engagement region of the internal lining. With such a construction the sealing lip can additionally be provided as a locking device with the engagement region, which facilitates a placing of the connection sleeve in the casing sleeve and enables an interim fixing before welding both sleeves together.

In a further embodiment a supporting ring can additionally be attached as an extension of the connection body in the direction of the measurement end in the internal lining. This ring can serve to additionally hold und fix the electronic components provided in the sensor.

BRIEF DESCRIPTION OF THE INVENTION

Further advantages and features of the inventive electronic sensor and the inventive manufacturing method are described in greater detail hereinafter relative to the diagrammatic drawings, wherein show:

FIG. 1 A longitudinal sectional view through a first embodiment of an inventive electronic sensor.

Figure 2:
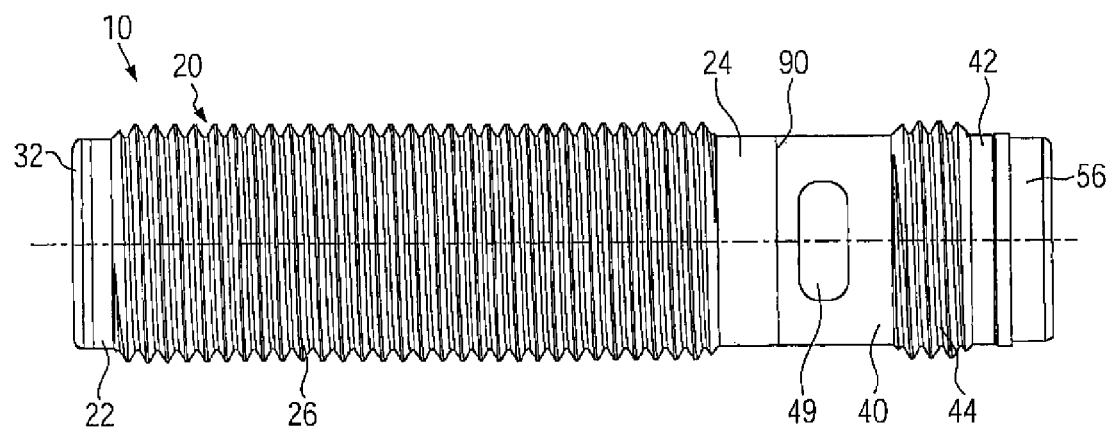

FIG. 2 A side view of the electronic sensor of FIG. 1.

Figure 3:
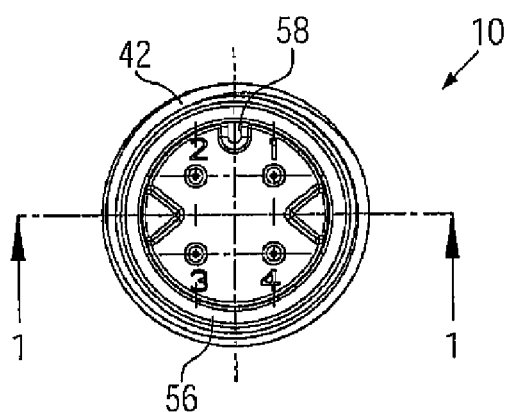

FIG. 3 A cross-sectional view of the sensor of FIG. 1.

Figure 4:
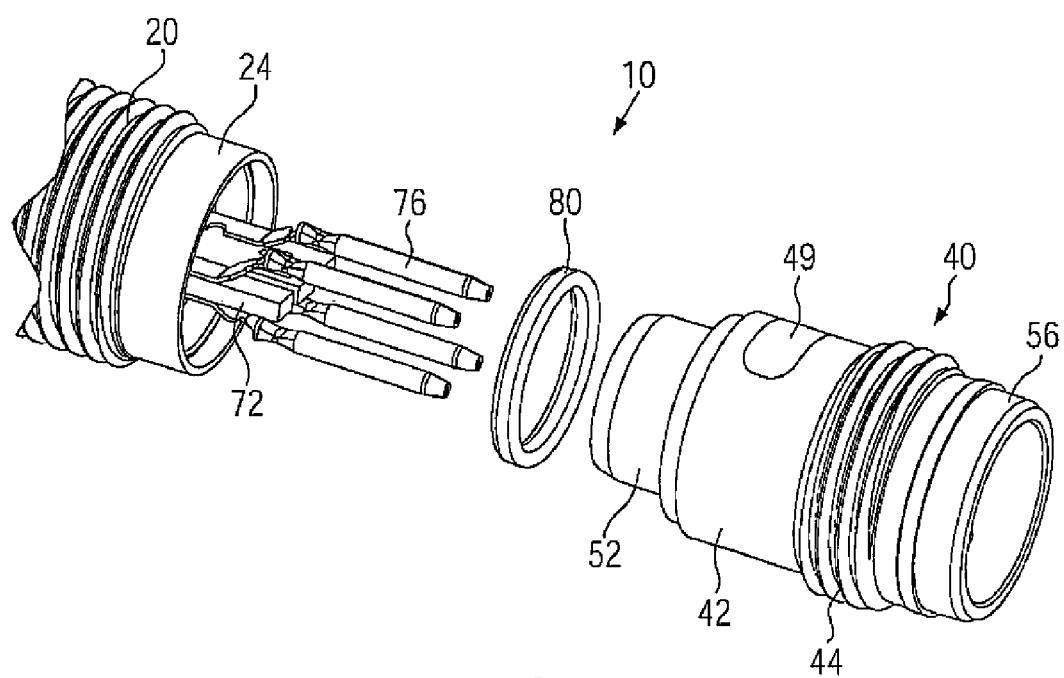

FIG. 4 A perspective exploded partial view of the connection end of the sensor of FIG. 1.

Figure 5:
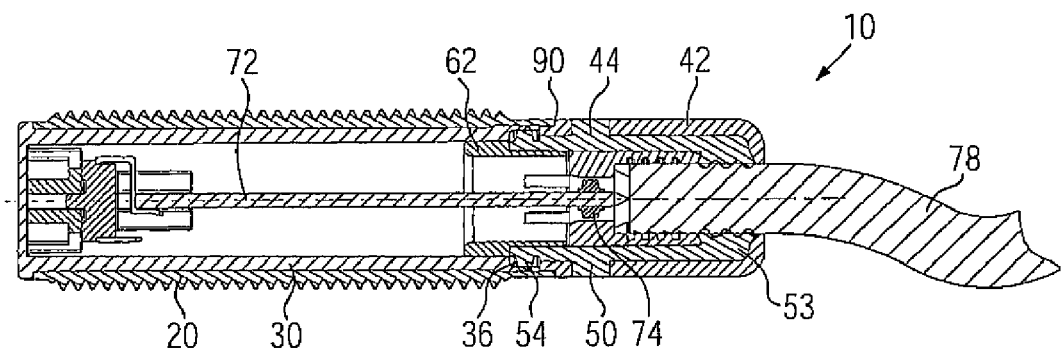
Figure 6:
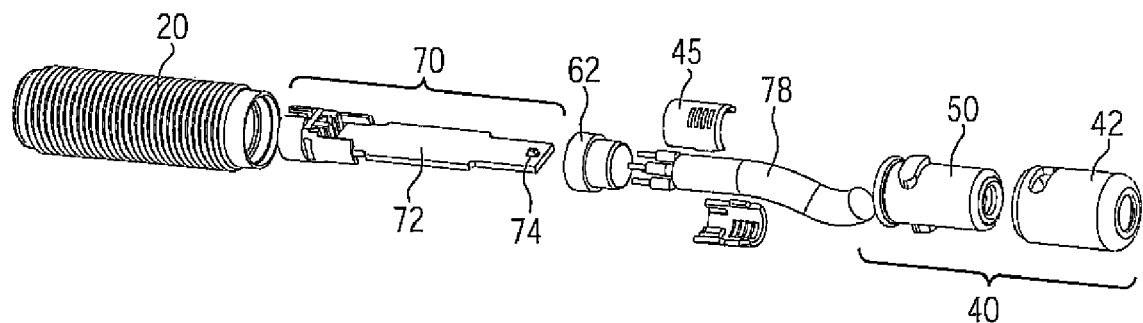

FIG. 5 a longitudinal sectional view of a second embodiment of an inventive electronic sensor; and FIG. 6 an exploded view of the electronic sensor of FIG. 5.

DETAILED DESCRIPTION OF THE INVENTION

The first embodiment of an inventive electronic sensor 10 shown in FIGS. 1 to 4 has as essential components a casing sleeve 20 with an internal lining 30 introduced by injection moulding, as well as a connector 40 with a connection sleeve 42 and a connection body 50. The components are given the same reference numerals throughout the drawings. FIG. 1 is a longitudinal section along line 1-1 in FIG. 3.

In a manner to be described hereinafter at a connection end 24 connector 40 is connected to casing sleeve 20. At a measurement end 22 of casing sleeve 20 opposite to the connection end 24 is provided a sensor element 60. In the embodiment shown the electronic sensor is an inductive sensor and consequently the sensor element 60 is a sensor coil in a coil shell. The internal lining 30 forms in the embodiment shown a receptacle for the sensor element 60 in the region of measurement end 22, so that there is no need here for a separate cup for the sensor element. According to the invention an electronic module 70 with printed circuit board 72 is provided in the interior 28 of casing sleeve 20. The circuit board 70 is held at the measurement end 22 by sensor element 60 and at connection end 24 by a receptacle formed in the connection body 50. The circuit board 72 carries sensor electronic components which are not shown in detail. In the region of connection end 24 circuit board 72 projects into a receptacle formed in connection body 50, where on the top and bottom sides of circuit board 72 there are light emitting diodes 74 which are used for displaying optical status and/or measurement informations. Casing sleeve 20 and connection sleeve 42 are made from metal and have a tubular or circular cylindrical shape. On its outside the casing sleeve 20 is provided with a thread 26, so that the sensor 10 can be screwed into a holder, where it can, if need be, undergo adjustment.

In the embodiment shown the connector 40 is in the form of a plug and socket connection, i.e. the connection sleeve 42, which can also be referred to as a cover, and the connection body 50, which can be referred to as an plastic internal lining, are so designed that they represent the casing parts of a plug and socket connection. In order to be able to fix a connection cable, a thread 44 is also present on the outside of connection sleeve 42.

According to another essential idea of the invention in the region of the measurement end of casing sleeve 20, i.e. the base casing, the internal lining 30 is closed on one side, so that there the internal lining 30 forms a lid-like closure 32. As can be seen in FIG. 1, the sensor element 60 engages on the inside of said closure 32. Closure 32 prevents vapours or other contaminants from the measurement end 22 from penetrating the sensor interior 28, which represents an important advantage compared with the prior art.

According to another essential idea of the invention, the connector 40 is so fitted to the connection end 24 of casing sleeve 20 that the connector 40 sealingly terminates with the internal lining 30. In this way it is possible to achieve an important aim of the invention, namely minimizing the number of casing joints and consequently the number of transitions to be sealed.

Thus, the construction according to the invention does not attempt per se to improve the quality of the casing joints. It has been recognized by the invention that fundamentally any casing joint represents a potential weak point and therefore a very tight encapsulation is fundamentally unfavourable. The essential inventive approach is consequently to reduce to a minimum from the outset the number of joints.

In the same way as the internal lining 30 is introduced into casing sleeve 20 by injection moulding, the same process is used for introducing connection body 50 into connection sleeve 42. Connection body 50 is made from light conducting plastic, so that optical informations can be passed to the outside from the light emitting diodes 74. To this end a plurality of openings 49 are provided in connection sleeve 42. In the embodiment shown the connection sleeve 42 is formed in such a way that the connection body 50 fills the recesses 49 and in this way forms transparent windows.

At a front end of connector 40 connection body 50 projects over the connection sleeve 42 and forms an overhang 56. If openings are formed in a clamping nut to be screwed on, as a result of the light conducting characteristics of the connection body 50 it is also possible for a user to read off optical informations.

In an area 46 casing sleeve 20 and connection sleeve 42 abut with one another and are non-detachably interconnected there after assembly, preferably by welding. This can in particular take place by laser welding, so that the heating resulting from welding is largely locally limited and consequently the seal is not impaired.

In the embodiment shown during manufacture a circumferential welding seam 90 is formed, which leads to a further improved sealing action.

A prefixing of the connection sleeve 42 relative to casing sleeve 20 is obtained by a reduced external diameter neck 48 formed on the connection sleeve 42 and which projects into and is guided by casing sleeve 20. For the provision of an optimum seal between casing sleeve 20 and connector 40 a sealing ring 80 is provided. A socket 52 of connection body 50 permits a clearly defined positioning of said sealing ring 80. As can be gathered from FIG. 4, prior to assembly the sealing ring 80 is pushed onto the socket 52 and then the connector 40 with sealing ring 80 is engaged on the connection end 24 of casing sleeve 20 and connection sleeve 42 is welded to casing sleeve 20. The casing sleeve 20 and the associated connector 40 are consequently so designed that in the assembled state they partly overlap and are tightly sealed by a minimum number of seals, preferably a single functional seal located in the overlap area.

As can be gathered from FIG. 1, a clearly defined reception area for sealing ring 80 is made available by a reduced wall thickness area 34 formed at the connection-side end of internal lining 30. So that a coupling can be engaged in pole-correct manner on the contact pins 76, on the inside of the connection body there is also a coding rib 58, which engages with a correspondingly shaped groove in a coupling element.

Both the internal lining 30 and the connection body 50 can be formed from an elastomer material.

FIGS. 5 and 6 show a second embodiment of the inventive sensor 10. In this embodiment the connector 40 is designed as a cable outlet for the cable 78.

In the following we only go into the differences between this embodiment and the embodiment of the FIGS. 1 to 4. Here the same components are given in each case the same reference numerals.

In these figures an additional embodiment is shown that achieves a sufficient sealing action without an additional sealing ring 80.

To this end a sealing lip 54 is formed at the connection body 50 in the area, where it projects over the connection sleeve 42. On assembling the sensor 10, wherein the connector 40 is pushed on or in the casing sleeve 20 respectively, the area of the connection body 50, where the sealing lip 54 is formed, is also pushed into the casing sleeve 20. An engagement region 36 for the sealing lip 54 is in turn formed in the internal lining 30 of the casing sleeve 20, the sealing lip 54 engaging into the engagement region 36.

The connection body 50 in the embodiment shown here is designed somewhat differently from the connection body 50 of the first embodiment of the FIGS. 1 to 4. In its rear part it shows a circumferential sealing device 53, which together with the cable jacket of the cable 78 is provided for sealing the interior 28 of the sensor.

The cable 78 with its electric conductors is carried on to the electronic module 70, particularly to the printed circuit board 72, and is connected there to the existing components. To relieve this connection from strain, an additional two-piece strain relief 45 is provided. This is attached around the cable 78 and is subsequently inserted into the connector 40. Here it comes to rest inside of the connection body 50, which in turn is designed to securely hold the strain relief 44. As shown in FIG. 5 the LEDs 74 are situated below the strain relief 44, so that it is also designed in a light guiding manner, e.g. transparent, in order to guide the light signals of the LEDs 74 outwards.

To facilitate a further fixation of the cable 78 and the electronic module 70, a supporting ring 62 is provided, which is positioned in the assembled state in the contact area of the casing sleeve 20 with the connector 40. The supporting ring 62 supports on the one hand the sealing lip 54, so that it forms a sealed connection with the engagement region 36, on the other hand it also serves to secure the positioning of the electronic module 70.

The present invention provides a novel electronic sensor with which as a result of a reduced number of casing joints particularly good sealing characteristics are obtained. The inventive sensors are particularly advantageously usable in sectors, where a high introduction of contaminants is to be expected, e.g. in the food processing industry.

The invention claimed is:

1. An electronic sensor, comprising:
a casing sleeve;
a sensor element for measuring a physical measurand, the sensor element being placed on a measurement end of the casing sleeve;
an electronic module located in the casing sleeve; and
a connector, which is placed on a connection end of the casing sleeve opposite to the measurement end;
wherein the casing sleeve includes a plastic internal lining, which is cup-shaped and closed at the measurement end of the casing sleeve;
wherein the internal lining extends to the connection end of the casing sleeve to such an extent that the connector is in sealing engagement with the internal lining;
wherein the connector has a connection sleeve; and
wherein the casing sleeve and the connection sleeve overlap one another.

2. The sensor as defined in claim 1,
wherein the sensor is an inductive sensor.

3. The sensor as defined in claim 1,
wherein the internal lining is made from an LCP-material which has at least one of: a water vapour transmission rate of smaller than about 0.01 g ×mm/m$^2$×day, and an oxygen permeability of smaller than about 0.01 cm$^3$× mm/m$^2$×day ×atm.

4. The sensor as defined in claim 1,
wherein the internal lining forms a receptacle for the sensor element in a region of the measurement end.

5. The sensor as defined in claim 1,
wherein the electronic module includes a printed circuit board, and wherein the printed circuit board of the electronic module projects into a connection body of the connector in an area where LEDs are located.

6. The sensor as defined in claim 1,
wherein there is a sealing ring between the internal lining and the connector.

7. The sensor as defined in claim 1,
wherein the connector is in the form of a plug and socket connection or has an outgoing cable.

8. The sensor as defined in claim 7,
wherein sealing devices for the sealed insertion of a cable are provided in a connection body of the connector.

9. The sensor as defined in claim 7,
wherein strain-relieving elements are provided in the connector.

10. The sensor as defined in claim 1,
wherein the connector has a connection body made from plastic.

11. The sensor as defined in claim 10,
wherein the connection sleeve is adapted to be connected to the casing sleeve.

12. The sensor as defined in claim 10,
wherein the connection sleeve has recesses for forming windows for optical information from an interior of the sensor.

13. The sensor as defined in claim 10,
wherein at least one of the connection body and the internal lining is made from a light conducting plastic.

14. The sensor as defined in claim 10,
wherein the internal lining is made from an LCP-material which has at least one of: a water vapour transmission rate of smaller than about 0.1 g ×mm/m$^2$×day, and an oxygen permeability of smaller than about 0.1 cm$^3$× mm/m$^2$×day ×atm.

15. The sensor as defined in claim 10,
wherein at least one of: the connection body is injection moulded into the connection sleeve, and the internal lining is injection moulded into the casing sleeve.

16. The sensor as defined in claim 10,
wherein at the connection body a sealing lip is formed and wherein at the internal lining an engagement region cooperating with the sealing lip is present.

17. The sensor as defined in claim 10,
wherein as an extension of the connection body in a direction of the measurement end a supporting ring is inserted into the internal lining.

18. The sensor as defined in claim 10,
wherein the connection body has a socket projecting into an interior of the internal lining and whose outside forms a contact surface for a sealing ring.

19. The sensor as defined in claim 18,
wherein an end region of the internal lining overlaps with the socket in a sealing area and wherein in the sealing area the internal lining has a reduced thickness for forming a reception area for a sealing ring.

20. A method for the manufacture of a sensor, comprising:
providing a casing sleeve with an internal lining, where the internal lining is cup-shaped and closed at a measurement end of the casing sleeve and extends through to a connection end of the casing sleeve opposite to the measurement end;

inserting a sensor element for measuring a physical measurand and an electronic module into the casing sleeve;
attaching a connector to the connection end of the casing sleeve; and
establishing a connection between the connector and the connection end of the casing sleeve in such a way that the connector comes into sealing engagement with the internal lining;
wherein the connector has a connection sleeve, and wherein the casing sleeve and the connection sleeve overlap one another.

21. The method as defined in claim 20,
wherein the sensor comprises:
the casing sleeve;
the sensor element;
the electronic module; and
the connector.

22. The method as defined in claim 20,
wherein the connection sleeve is connected to the casing sleeve.

23. The method as defined in claim 22,
wherein the connection sleeve is at least one of: welded to the casing sleeve, and locked to the casing sleeve on assembling the sensor.

24. The method as defined in claim 23,
wherein the connection sleeve is welded to the casing sleeve with a circumferential welding seam.

* * * * *